(12) United States Patent
Wolter et al.

(10) Patent No.: US 9,483,927 B2
(45) Date of Patent: Nov. 1, 2016

(54) METHOD AND SYSTEM FOR CONTROLLING A VEHICLE DURING AN AUTONOMOUS CONTROL MODE

(71) Applicant: Ford Global Technologies, LLC, Dearborn, MI (US)

(72) Inventors: Stefan Wolter, Aachen (DE); Florian Golm, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 14/249,036

(22) Filed: Apr. 9, 2014

(65) Prior Publication Data

US 2014/0300479 A1  Oct. 9, 2014

(30) Foreign Application Priority Data

Apr. 9, 2013 (DE) .................. 10 2013 206 212

(51) Int. Cl.
| | |
|---|---|
| G08B 23/00 | (2006.01) |
| G08B 21/04 | (2006.01) |
| B60W 50/14 | (2012.01) |
| G08B 21/06 | (2006.01) |
| B60W 40/08 | (2012.01) |

(52) U.S. Cl.
CPC .............. *G08B 21/04* (2013.01); *B60W 50/14* (2013.01); *G08B 21/06* (2013.01); *B60W 2040/0863* (2013.01)

(58) Field of Classification Search
CPC ..... B60W 50/14; G05D 1/021; G08B 21/04; G08B 21/06; G01P 3/38

USPC ........... 340/576, 573.1, 438, 439, 435, 903, 340/902, 901, 904, 545.2, 545.4, 575
See application file for complete search history.

(56) References Cited

U.S. PATENT DOCUMENTS

| | | | |
|---|---|---|---|
| 5,717,606 A * | 2/1998 | Hara et al. ................... 701/44 |
| 6,226,570 B1 | 5/2001 | Hahn | |
| 7,592,920 B2 * | 9/2009 | Kopf et al. .................. 340/576 |
| 7,652,583 B2 * | 1/2010 | Sanchez et al. ............. 340/575 |
| 7,783,426 B2 * | 8/2010 | Kato et al. ................... 701/300 |
| 8,405,496 B2 * | 3/2013 | Bennett ....................... 340/439 |
| 9,188,985 B1 * | 11/2015 | Hobbs ................. G05D 1/0255 |

(Continued)

FOREIGN PATENT DOCUMENTS

| | | |
|---|---|---|
| DE | 10338945 A1 | 3/2005 |
| DE | 102011101708 A1 | 11/2012 |
| DE | 102012213965 A1 | 2/2014 |

OTHER PUBLICATIONS

German Patent and Trademark Office, Examination Report for the corresponding German Patent Application No. 10 2013 206 212.5 mailed Feb. 25, 2014.

*Primary Examiner* — Daniel Previl
(74) *Attorney, Agent, or Firm* — Frank A. MacKenzie; Brooks Kushman P.C.

(57) ABSTRACT

A method and control system for maintaining attentiveness of a driver of a vehicle during an autonomous control mode. A series of cognitively demanding tasks is presented to the driver via a man-machine interface during the autonomous control mode. Driver responses to the tasks are monitored, and an audible alert is provided to the driver if the response of the driver and/or a reaction time of the driver in making the response indicate an insufficient level of driver attentiveness.

20 Claims, 4 Drawing Sheets

(56) References Cited

U.S. PATENT DOCUMENTS

| | | |
|---|---|---|
| 2008/0231461 A1 | 9/2008 | Sanchez et al. |
| 2010/0033333 A1* | 2/2010 | Victor et al. .................. 340/576 |
| 2013/0158741 A1* | 6/2013 | Hahne .................... G08B 21/06 701/1 |
| 2014/0156133 A1* | 6/2014 | Cullinane ............. B60W 30/00 701/23 |

* cited by examiner

METHOD AND SYSTEM FOR CONTROLLING A VEHICLE DURING AN AUTONOMOUS CONTROL MODE

CROSS-REFERENCE TO RELATED APPLICATIONS

This application claims foreign priority benefits under 35 U.S.C. §119(a)-(d) to DE 10 2013 206 212.5 filed Apr. 9, 2013, which is hereby incorporated by reference in its entirety.

TECHNICAL FIELD

The present invention relates to controlling a vehicle with temporary autonomous vehicle control.

BACKGROUND

The development of fully autonomously traveling vehicles is currently the subject of increased efforts. In view of the complexity of the task and the associated safety aspects, however, it is expected to take decades to fully achieve this objective.

Until then, driver assistance systems represent an intermediate objective, which can take over temporary control over the vehicle in defined, relatively straightforward driving situations, e.g. when traveling on freeways, whereby automatic control of the longitudinal and transversal movements of the vehicle can take place by means of a lane keeping assistant in conjunction with an automatic separation maintenance means in relation to a vehicle ahead.

With said assistance systems, however, it is common that situations can occur that make taking over manual control by the driver necessary. For example, when traveling on a freeway the vehicle ahead can leave the freeway or another vehicle can suddenly cut in. Therefore it must always be possible for the driver to take over control again at very short notice when necessary.

For this purpose it must not only be guaranteed that the driver is awake, but that he can pay the driver assistance systems a certain amount of attention, so that the driver can react quickly enough in case of a transfer of control being necessary.

So-called "dead man circuits" are known from railway traffic and various other applications; with these a driver has to operate a button or a lever (and release it again) at defined time intervals as demanded by a signal; otherwise forced braking is initiated. In this way possible accident damage caused by inattention of the driver of the vehicle should be prevented by the system changing to a safer state in the case of doubt (fail-safe principle).

However, with such a dead man system it is tempting over time to carry out the corresponding operation more or less by reflex, so that these operations can even be carried out "almost when half asleep". Moreover, it is not always guaranteed by this that the driver will give sufficient attention to the displays of the driver assistance systems.

Finally, the operation of a classic dead man circuit may be perceived by the driver of an automobile as monotonous and hence ultimately as annoying.

SUMMARY

In a disclosed embodiment, a method for maintaining attentiveness of a driver of a vehicle during an autonomous control mode comprises presenting a series of cognitively demanding tasks to the driver via a man-machine interface during the autonomous control mode; monitoring response of the driver to the tasks of the series, and providing an audible alert to the driver if the response of the driver and/or a reaction time of the driver in making the response indicate an insufficient level of driver attentiveness.

In another disclosed embodiment, the method comprises placing the vehicle into a fail-safe state in the absence of a response to one of the tasks in the series within a specified time period.

In another disclosed embodiment, the method comprises determining that the level of driver attentiveness is adequate if the response is made within specified time window, even if the response is not correct.

In another disclosed embodiment, the method comprises adaptively matched a degree of difficulty of tasks to driver capabilities, the driver capabilities assessed by previous responses.

In another disclosed embodiment, a subject area and/or a difficulty of a task in the series is configurable by the driver.

In another disclosed embodiment, at least one of the tasks in the series requires for its solution logical and/or mathematical thought processes on the part of the driver and/or calls upon the knowledge, the ability to respond and/or the memory retention of the driver.

In another disclosed embodiment, at least one task of the series is visually displayed to the driver on a display unit, the display unit further dues to display a message regarding taking over responsibility for control.

In another disclosed embodiment, the method further comprises detecting that the driver is operating a communication system in a manner indicating a sufficient degree of driver attentiveness, and suspending presentation of the tasks while the driver is operating the communication system Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
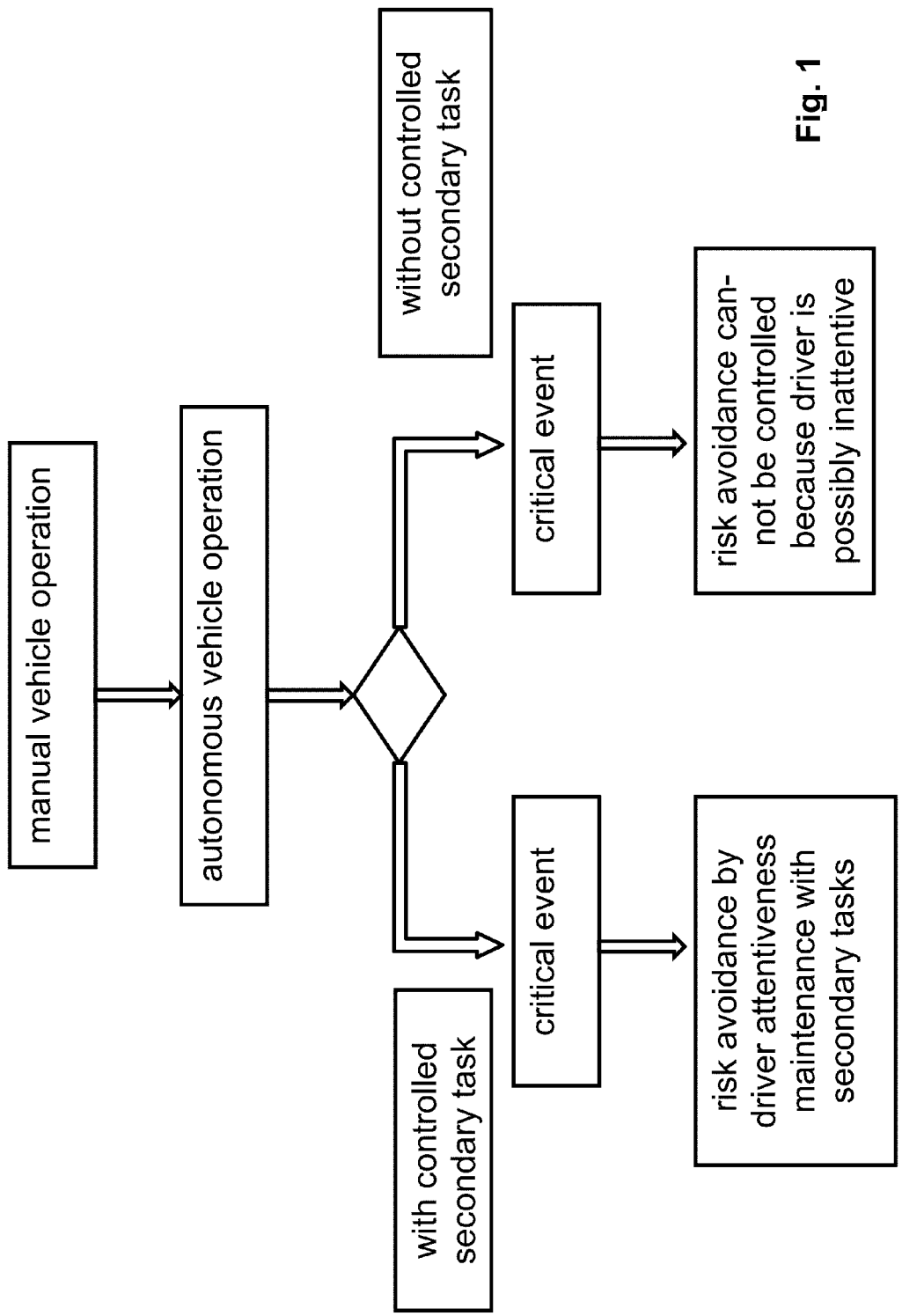
FIG. 1 is a diagram illustrating the advantages of the controller according to the invention.

As can be seen from the schematic diagram according to FIG. 1, the invention has particular advantages with a possibly necessary transition from the autonomous vehicle operating mode into the manual or driver-controlled autonomous vehicle operating mode. By means of the controlled maintenance of the attentiveness of the driver (cf. the left part of the diagram) the driver can rapidly take over control in the event of critical events, whereby risks are avoided.

Figure 2:
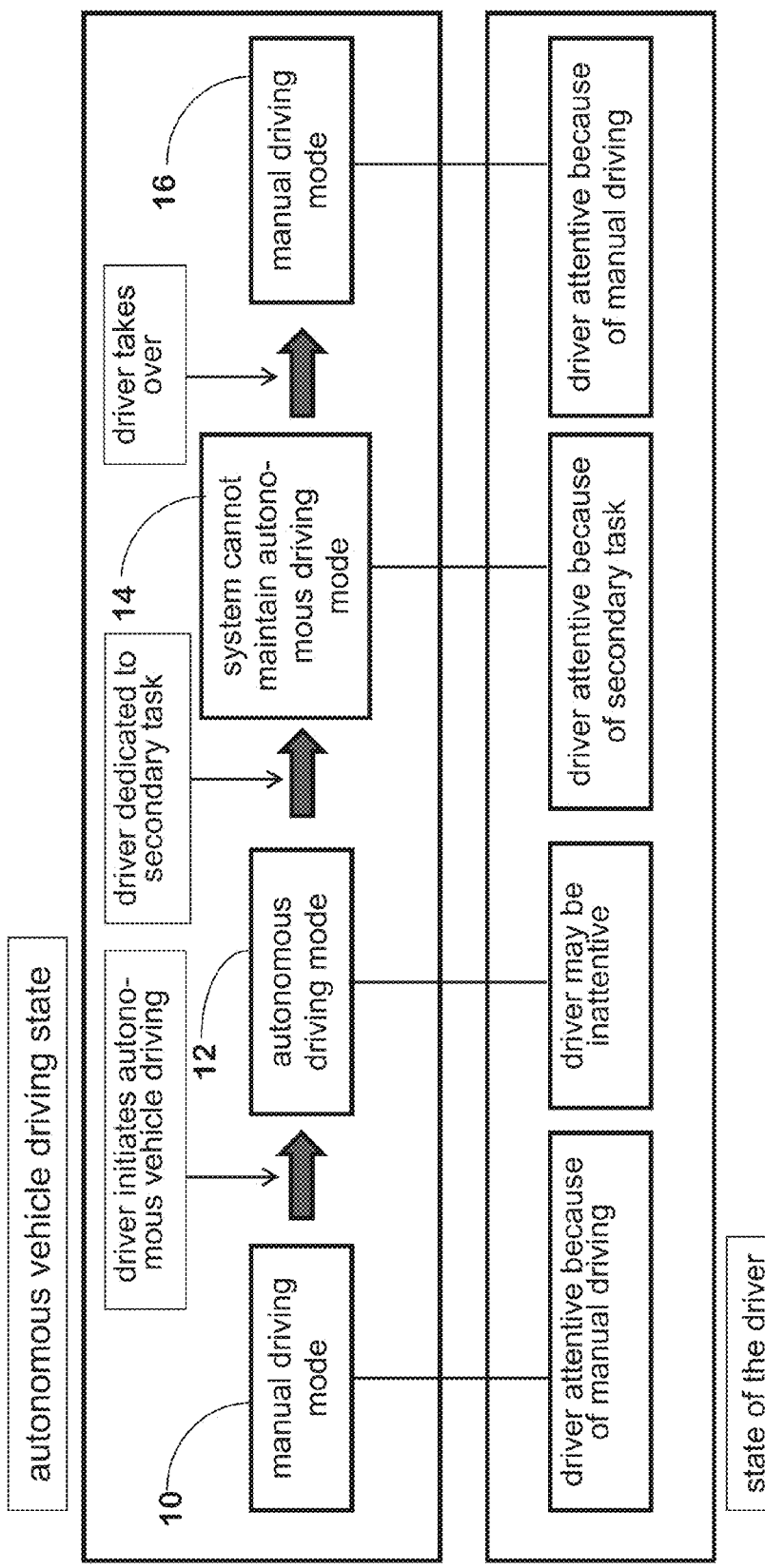
FIG. 2 is a diagram of the variation with time of the vehicle operating status and of the status of the driver.

In FIG. 2 the variation with time of the vehicle operating mode and of the driver state are illustrated during control according to the present invention. In the lower region the degree of attentiveness of the driver in each case is illustrated. The illustration starts in the manual driving mode 10, in which the degree of attentiveness of the driver is assumed to be sufficient.

After the driver has initiated an autonomous driving mode 12 in the presence of suitable driving circumstances (e.g. freeway travel), the driver is basically relieved of the observation of the road and operation of the vehicle. In this case inattentiveness of the driver can occur, especially if the autonomous driving mode lasts for a long time.

Such inattentiveness has a negative effect if the system can no longer maintain the autonomous driving mode (14) because of external circumstances and the driving situation. In this case the driver may have to take over responsibility for control of the vehicle again within a few seconds.

If the attentiveness of the driver is now maintained by the regular placement of tasks (also referred to as "secondary tasks"), such a takeover of control can take place sufficiently rapidly, so that the vehicle can change to a manual mode 16 with sufficient driver's attentiveness.

By placing a cognitively demanding task and monitoring the response of the driver it is not only checked whether the driver is attentive enough in order to take over the responsibility for control of the vehicle again within a given time window where necessary, but also the attentiveness of the driver is increased by the cognitively demanding task itself.

Figure 3A:
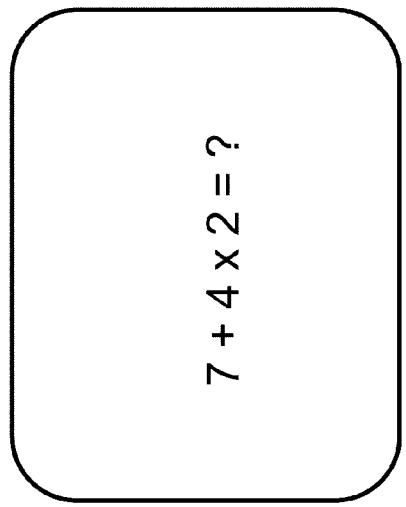
FIGS. 3A, B shows examples for displays that may be used in the disclosed method.
Figure 5A:
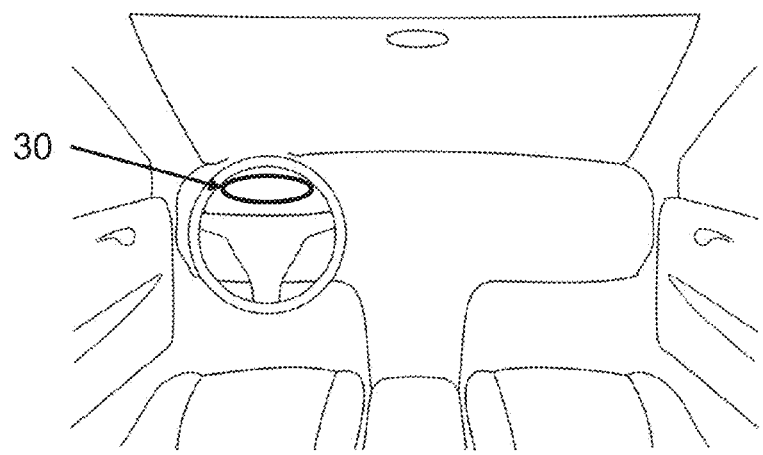
FIGS. 5A-C shows various display positions that can be used within the vehicle.
Figure 5B:
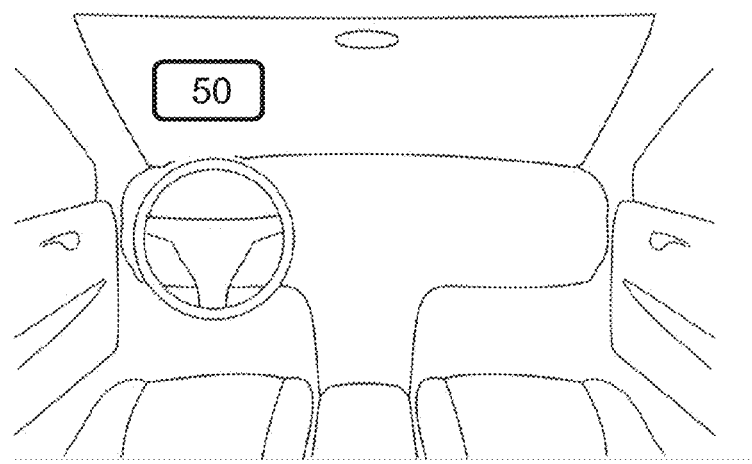
Figure 5C:
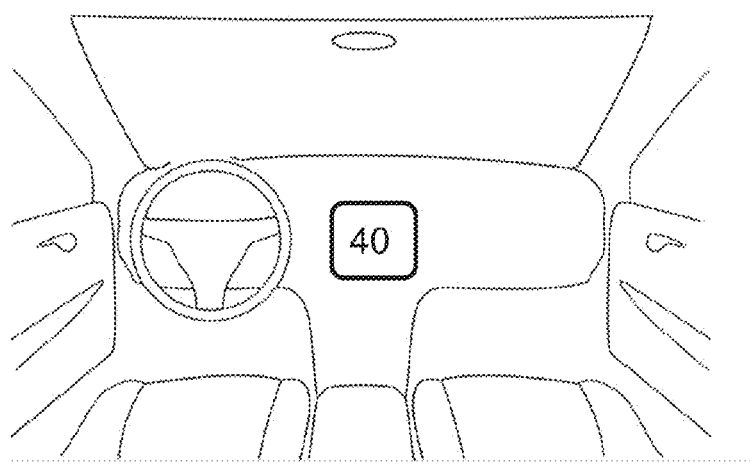

In FIG. 3A a possible task for maintaining attentiveness for the driver is illustrated, which according to the options illustrated in FIGS. 5a-c can be implemented on the display of a combination instrument 30 (cf. FIG. 5A), a central console 40 (cf. FIG. 5C) or on a head-up display 50 (cf. FIG. 5B). The solution of the task, which is to be considered as exemplary, can be input by means of a (not illustrated) numeric keypad, or can be selected from a limited number of possible responses in the manner of a type of multiple-choice question by means of a cursor (not illustrated).

If the driver does not respond to the task within a specified time (e.g. 10 seconds), initially a warning tone sounds. If after a further 10 seconds the driver has still not operated a control element, a warning appears that the vehicle will be brought into a stopped state after the expiry of 10 seconds (by stopping on a shoulder on the freeway if necessary) if there has still been no reaction. Sufficient attentiveness of the driver is thus guaranteed in the event that a takeover of manual control by the driver suddenly becomes necessary.

In the absence of a response in step a) within a specified time window, and possibly following further warnings, the driver's attentiveness cannot be assumed to be sufficient. If necessary, the vehicle can then be put into a fail-safe state, e.g. can be stopped along the side of the roadway.

If on the other hand the driver responds in time (irrespective of whether the response is correct or not), then a new task is placed following a certain waiting period (e.g. 30 seconds) if the autonomous mode is continued.

In some circumstances, it may not be necessary to determine the accuracy of the response of the driver to the cognitively demanding task in itself. Rather, it may be more important that any response (regardless of accuracy) is made within a specified time window, whereupon sufficient driver's attentiveness is determined.

If, however, the response of the driver allows it to be detected that each task placed is not dealt with—e.g. if the first choice is always selected for a task with multiple responses—this rather points to a reflex or routine reaction of the driver, whereupon reduced attentiveness of the driver can be determined.

In order to avoid placing too much or too little demand on the driver, in one embodiment of the method it is useful to adaptively adjust the degree of difficulty of the tasks to the capabilities of the driver. The tendency should be that a driver can solve a wide range of tasks in order to avoid frustrating experiences. However, questions that are too easy should be avoided—at least in succession.

The subject area and the difficulties of the tasks can be designed to be configurable by the driver. Among the possible tasks can be e.g. mental arithmetic tasks, quiz questions, questions that test logical thinking (as in known tests for determining an intelligence quotient), vocabulary training for a foreign language, memory training (e.g. as in the type of known board game according to the pairs principle). The method according to the invention thus also provides the additional benefit for the driver that mental skills can be trained.

Furthermore, typical video games or similar are also possible, possibly even in competition with other current users of the system in other vehicles in the presence of an online connection. The tasks are preferably stored and/or are obtained from a server by means of an online connection.

The individual tasks may be selected by means of a random number generator and it is recorded in an internal memory if a task was assigned (and possibly with what result), so that the tasks are not repeated or not repeated too soon.

A task that is cognitively demanding for the driver should be taken to mean such a task that goes beyond a simple demand for timely operation of a control element (such as would be the case e.g. with a classic dead man circuit), and especially which requires logical and/or mathematical thought processes on the part of the driver for their solution and/or which make use of the knowledge, the responsiveness and/or the memory retention of the driver.

Figure 3B:
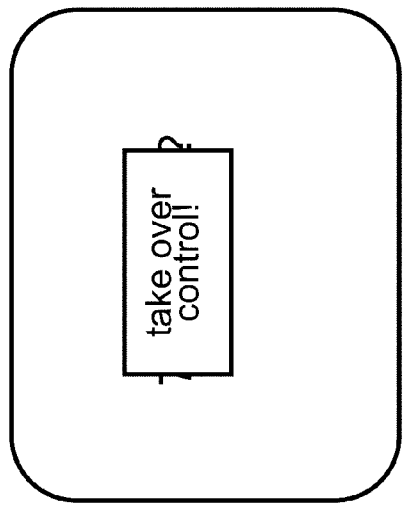

If the case of a necessary takeover of control by the driver occurs (a voluntary takeover of control is possible at any time), then according to FIG. 3B the current task can be visually overlaid by a suitable message, so that this is immediately perceived by the driver. Once the driver takes over control (e.g. makes a steering wheel movement), the illustration of the superimposed message disappears and the task and the vehicle are in the manual mode, in which the placement of further tasks is preferably paused in order to not distract the driver from traffic conditions.

The tasks presented to the driver may be displayed visually on a display unit. The attention thus paid to said display unit while processing the tasks is therefore very advantageous, because any messages regarding taking over responsibility for control can be signaled on the same display unit—preferably visually overlaying the tasks.

This represents another advantageous aspect of the invention, because in this way it can be guaranteed that the driver immediately perceives even relatively complex messages. If instead the driver is distracted, his attention must initially be steered to the display by a warning tone, a voice message and/or light signals, whereby in turn time would be lost. Said solution is also advantageous compared to automatic voice messages, because the voice message may require a relatively long time, especially in more complex situations.

If the driver is already otherwise active during autonomous driving phases, e.g. is operating a communications system for processing messages or for surfing the Internet, and this is detected by the vehicle controller, then a sufficient degree of attentiveness of the driver can be assumed, so that placing tasks for controlling attentiveness does not have to take place, especially as this would tend to annoy the driver in this situation.

Diverse solutions are known in the prior art for implementing the man-machine interface for communications with the driver. Should the placement of the tasks take place visually by means of a display—which is preferable within the scope of the invention—then the corresponding display (which preferably also displays control transfer requests and other important vehicle messages) can be integrated within a combination instrument and/or be implemented within a central console of the vehicle and/or by means of a head-up display (merging in the windscreen, e.g. by projection).

The input of the responses may take place as known in the prior art, e.g. by means of switches on the steering wheel, a joystick or by means of touch commands if the corresponding display is in touch-sensitive form.

The screen displays schematically illustrated in FIGS. 3A and 3B can also be transferred to a portable communications device of the driver. Once the driver enters the vehicle with this, a wireless communications connection is established between the portable device and the vehicle controller or infotainment system, and the communications device signals the control activities of the user to the vehicle controller. If the driver carries out individual activities in the autonomous vehicle operating mode (e.g. inputting e-mails), then sufficient attentiveness of the driver is assumed and the placement of tasks does not occur. If no meaningful activities occur, then the tasks mentioned are preferably shown on the display of the mobile communications device, by means of which they can also be responded to (e.g. by means of a touch screen).

For example, in the case of a video playback or a TV mode of the mobile device, the task to be responded to by the driver can also be merged into the current image, so that the flow of the replay need not be interrupted.

Any warning messages or control takeover messages are likewise shown on the display of the communications device (possibly also on other vehicle displays).

The use of a portable communications device that can be carried along by the driver and that has a bidirectional communications connection to the vehicle controller represents an interesting variant of the man-machine interface. Thereby this can be a smartphone, a tablet computer or similar, which is preferably connected to the vehicle controller wirelessly (e.g. by means of short-range radio technology or WLAN). Said communications device is then used to display the tasks and for inputting responses, wherein warning messages or control responsibility takeover prompts are likewise shown on the display of the mobile device.

With other uses of the portable communications device, e.g. during message processing on the device by the driver, the corresponding user inputs can be communicated to the vehicle controller, which can conclude therefrom that there is sufficient driver's attentiveness. Also in this case, warning messages or control responsibility takeover prompts are preferably directly displayed on the mobile communications device, so that the driver perceives the same immediately.

Figure 4:
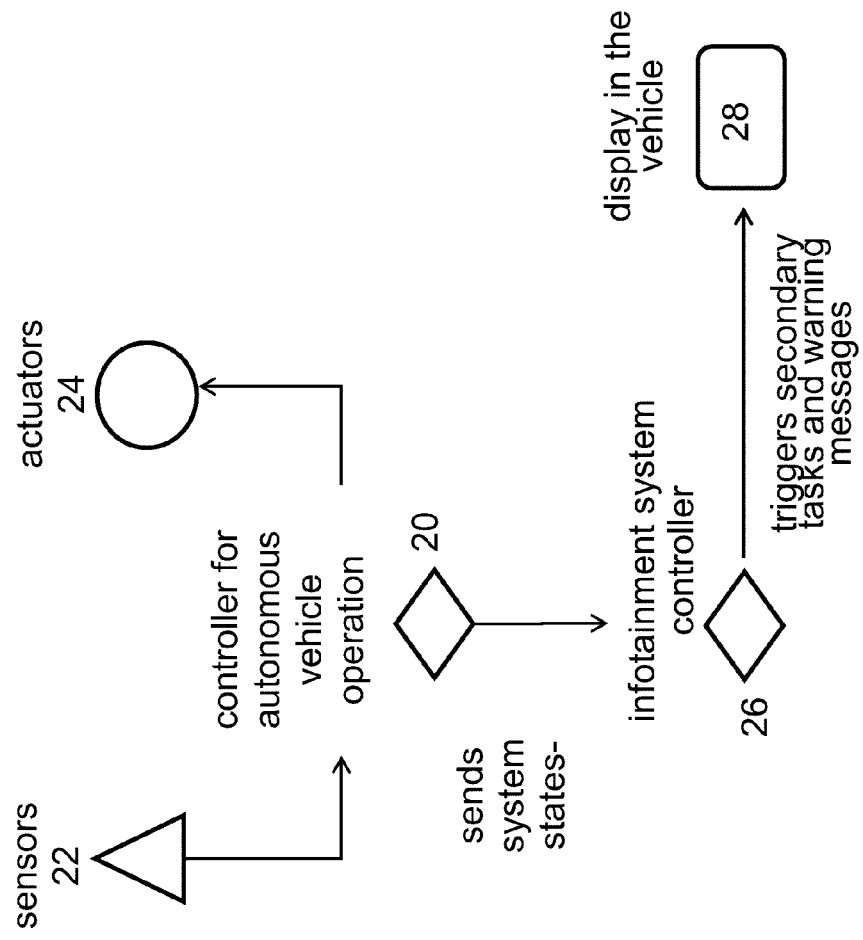
FIG. 4 shows a basic representation of the hardware configuration usable in the disclosed method.

The underlying configuration of the system according to the invention is illustrated schematically in FIG. 4. The controller 20 for the autonomous driving mode operates a number of sensors 22 and actuators 24, as described in detail in the prior art.

Communications with the driver take place in the exemplary embodiment by means of an infotainment system controller 26, which controls the displays 28 and receives inputs from the driver. The communications between the vehicle controller 20 and the infotainment system takes place by means of defined interfaces.

An autonomous driving mode referred to herein may include mixed states in which the driver only bears partial responsibility. Likewise, a manual or driver-controlled vehicle operating mode referred to herein may also include the support of driver assistance systems, i.e. only one aspect of vehicle control (e.g. the steering) may be transferred to the driver.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method comprising:
   during an autonomous driving mode, presenting a cognitively demanding task to a vehicle driver via a display unit further operative to display a message regarding taking responsibility for vehicle control;
   evaluating driver attentiveness based upon a response of the driver to the task; and
   providing an alert to the driver if the driver attentiveness is insufficient for the driver to safely take vehicle control.

2. The method of claim 1, further comprising placing the vehicle into a fail-safe state if no response is made to the task within a specified time period.

3. The method of claim 1, wherein the driver attentiveness is determined to be adequate if the response is made within a specified time window, even if the response is not correct.

4. The method of claim 1, wherein a degree of difficulty of the task is adaptively matched to driver capabilities, the driver capabilities assessed by a previous response to a previously presented task.

5. The method of claim 1, wherein a subject area and/or a difficulty of the task is configurable by the driver.

6. The method of claim 1, wherein the task requires for its solution logical and/or mathematical thought processes by the driver and/or calls upon at least one of knowledge, ability to respond, and memory retention of the driver.

7. The method of claim 1, wherein the message regarding taking over responsibility for control is presented to visually overlay the task.

8. The method of claim 1, further comprising:
   detecting that the driver is operating a communication system in a manner indicating a sufficient degree of driver attentiveness; and
   suspending presentation of additional tasks while the driver is operating the communication system.

9. The method of claim 1, wherein the task is one of a series of tasks presented to the driver.

10. The method of claim 1, wherein the evaluation of driver attentiveness is based upon at least one of an accuracy of the response and a reaction time taken by the driver to make the response.

11. Apparatus operative to:
during an autonomous driving mode of a vehicle, display a cognitively demanding task to a vehicle driver on a display unit further operative to display a message regarding taking vehicle control responsibility;
evaluate driver attentiveness based upon a driver response to the task; and
provide an alert to the driver if the driver attentiveness is insufficient for the driver to safely take vehicle control.

12. The apparatus of claim 11, further operative to place the vehicle into a fail-safe state if a response to the task is not made within a specified time period.

13. The apparatus of claim 11, wherein the driver attentiveness is determined to be adequate if the response is made within a specified time window, even if the response is not correct.

14. The apparatus of claim 11, wherein a degree of difficulty the task is adaptively matched to driver capabilities, the driver capabilities assessed by a previous response to a previously presented task.

15. The apparatus of claim 11, wherein a subject area and/or a difficulty of the task is configurable by the driver.

16. The apparatus of claim 11, wherein the task requires for its solution logical and/or mathematical thought processes by the driver and/or calls upon at least one of knowledge, ability to respond, and memory retention of the driver.

17. The apparatus of claim 11, wherein the message regarding taking over responsibility for control is presented to visually overlay the at least one task.

18. The apparatus of claim 11, further operative to:
detect that the driver is operating a communication system in a manner indicating a sufficient degree of driver attentiveness; and
suspend presentation of additional tasks while the driver is operating the communication system.

19. The apparatus of claim 11 further operative to: display a series of tasks to the driver.

20. The apparatus of claim 11, wherein the evaluation of driver attentiveness is based upon at least one of an accuracy of the response and a reaction time taken by the driver to make the response.

* * * * *